Feb. 20, 1968 J. A. LEONARD 3,369,845

ANTI-SKID BRAKE CONTROL

Filed Aug. 2, 1966

INVENTOR.
JOHN A. LEONARD

BY Fishman + Van Kirk

ATTORNEYS.

United States Patent Office 3,369,845
Patented Feb. 20, 1968

3,369,845
ANTI-SKID BRAKE CONTROL
John A. Leonard, Windsor Locks, Conn., assignor to United Aircraft Corporation, East Hartford, Conn., a corporation of Delaware
Filed Aug. 2, 1966, Ser. No. 569,744
15 Claims. (Cl. 303—21)

The present invention relates to brake control systems. More particularly, this invention is directed to a pure fluid anti-skid brake control. Accordingly, the general objects of the present invention are to provide novel apparatus of such character.

Many various brake control systems have been proposed and, in some cases, fabricated and utilized. However, in the prior art, the available brake control systems were comparatively fragile, complex and required external power sources. All of these inherent characteristics of the prior art controls; fragility, complexity and necessity for external power; have limited the utility of the systems. For example, anti-skid brake control systems have not to date been used on high production motor vehicles or on smaller aircraft.

An anti-skid brake control must be susceptible of withstanding rather severe shocks, particularly for aircraft use, and thus must be comprised of sturdy components. Also, since repair may be required where highly experienced or skilled mechanics are unavailable, the systems and components may not be complex from a technological standpoint. In this same vein, the components and systems must be susceptible to being made comparatively inexpensively and on a mass production basis in order to encourage wide spread usage and similarly to make component replacement rather than repair feasible. In regards to simplifying the system, external power sources should, to the extent possible, be eliminated to thereby enhance reliability. Obviously, the chances of device or system failure are multiplied by the number of connections to external electrical or hydraulic energy sources or to mechanical driving means. In addition to the foregoing criteria, an anti-skid brake control should also be capable of operation irrespective of the terrain over which the vehicle upon which it is installed is traveling.

The present invention overcomes the aforementioned disadvantages of prior art brake control systems and meets all the above-detailed design criteria of an anti-skid brake control.

It is, therefore, an object of the present invention to provide a brake control system.

It is another object of the present invention to provide an anti-skid brake control system.

It is also an object of the present invention to provide a pure fluid brake control system.

It is a further object of the present invention to provide a pure fluid anti-skid brake control.

It is yet another object of the present invention to provide a pure fluid brake control system which employs, on each of the wheels to be braked, a sensor which does not require a connection to an external power source.

It is still another object of the present invention to provide a pure fluid anti-skid brake control which employs, on each of the wheels to be braked, a vortex rate sensor.

It is another object of the present invention to provide a pure fluid anti-skid brake control which provides an indication of skidding of the vehicle upon which it is installed when any one or all of the wheels upon which sensors are mounted are skidding.

It is also an object of the present invention to provide an all fluid anti-skid brake control for a vehicle which employs, at least on a pair of oppositely disposed wheels, sensors which provide an indication of the rate of rotation of the wheel without connection to an external power source.

It is still another object of the present invention to provide a pure fluid brake control system for a vehicle which employs, on at least a pair of oppositely disposed wheels, means for providing signals commensurate with the rate of rotation of the wheels and which provides, in response to such signals, an output indicative of a condition when either one or both of the wheels is skidding.

It is a further object of the present invention to provide a pure fluid anti-skid brake control which is gain compensated.

It is another object of the present invention to provide a pure fluid anti-skid brake control employing, on at least a pair of oppositely disposed wheels, rate sensors which provide output signals commensurate with the velocity of the vehicle and the rate of rotation of the wheels.

It is also an object of the present invention to provide a pure fluid anti-skid brake control utilizing sensors and associated components whose gain is a function of the magnitude of the input signals thereto.

It is another object of the present invention to provide a pure fluid brake control system which is less expensive to manufacture than prior art devices of like character.

It is a further object of the present invention to provide a pure fluid brake control system which is less complex, more reliable, and less expensive to manufacture than prior devices of like character.

It is another object of the present invention to provide a pure fluid anti-skid brake control system which is less complex, more reliable, lighter and less expensive than prior art devices of such character.

It is a still further object of the present invention to provide a gain compensated pure fluid anti-skid brake control for vehicles which employ, on at least a pair of oppositely disposed wheels, angular rate sensors which do not require connection to external power sources, the system providing a brake override signal whenever one or all wheels upon which the sensors are mounted are in a skidding condition.

These and other objects of the present invention are accomplished by a pure fluid system which employs, as angular rate sensors for at least two of the wheels to be braked, vortex rate sensors. These vortex rate sensors are powered from vehicle mounted pick up devices such as Pitot probes which provide fluid input signals commensurate with the velocity of the vehicle. The sensors thus generate output signals commensurate with both vehicle velocity and rate of rotation of the wheel upon which each sensor is mounted. The output signals from the vortex rate sensors are applied to a highly reliable pure fluid computer which provides brake override signals to bleed pressure from the brake system of the skidding wheel. The system operates to provide the override signal under the condition of any one wheel rotating at a rate less than the other wheels upon which sensors are mounted or upon the condition when all wheels upon which sensors are mounted are skidding.

This invention may be better understood and its various advantages will become apparent to those skilled in the art by reference to the accompanying drawing wherein like reference numerals refer to like elements in both figures and in which.

Figure 2:
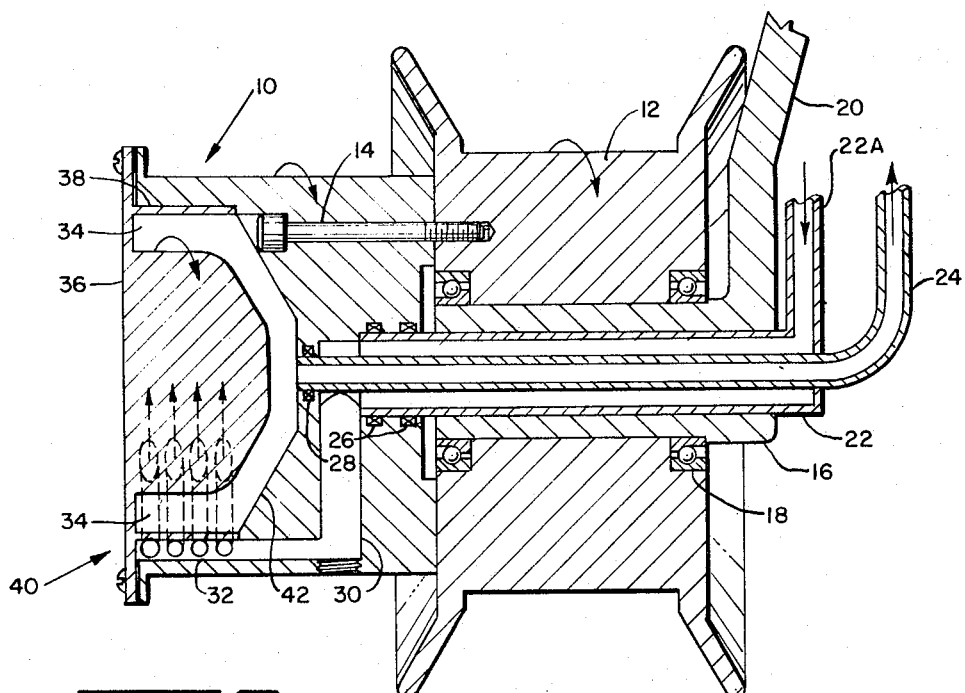
FIGURE 2 is a cross sectional view of one of the sensors of the embodiment of FIGURE 1 mounted in place upon a wheel housing.

While not limited thereto in its utility, the present invention will be described in relation to a system employing a pair of sensors which are mounted upon oppositely disposed wheels of the main landing gear of an aircraft. In order to facilitate understanding of the present invention, the operation of the sensor disclosed in FIGURE 2 will first be explained. This sensor, indicated generally at 10, is shown mounted upon the housing 12 of the wheel of an aircraft. Sensor 10 is bolted to wheel housing 12 as by bolts 14, only one of which is shown, and thus the sensor will rotate with the wheel. The wheel, of course, rotates about an axle 16 on bearings 18, the axle and wheel being suspended from the landing gear by means of support 20.

Axle 16 is hollow and has passing therethrough a pair of coaxial conduit means 22 and 24. As will be described in greater detail below, the outer or larger diameter conduit 22 delivers an input signal (fluid stream) to the sensor 10. The inner or smaller diameter conduit 24 delivers the output signal from sensor 10 to the hydraulic computer which will be described in detail below in the discussion in FIGURE 1. Sensor 10 is provided with a pair of O-ring type sliding seals 26 and an O-ring seal 28 to enable it to rotate about the inner terminations of conduits 22 and 24. The other end of conduit 22, a portion of which is indicated at 22a, is disposed so as to be pointing in the normal direction of forward travel of the vehicle. Accordingly, conduit portion 22a, since it does not rotate with the wheel, functions as a sensor which provides a fluid (air) stream the pressure of which is proportional to the forward velocity of the vehicle.

The fluid delivered via conduit 22 to sensor 10 passes, via a bore 30, to a plurality of discharge tubes 32. Tubes 32 tangentially discharge the input fluid as a plurality of streams into an annular passage 34 which is defined by centrally disposed plug 36 and outer walls 38. Plug 36 and outer defining walls 38 are integral with the end cap of housing 10 which is indicated generally at 40. Each cap 40 is bolted to an annular flange on the main body of sensor 10.

Plug 36 is of substantially conical shape and is positioned in a recess provided therefore in the main body of sensor 10. Spaced from plug 36 and substantially commensurate in shape therewith so as to define the generally conical shaped passage is an inner wall 42. Wall 42 extends outwardly from the inner end of conduit 24 and terminates at wall portion 38.

As will now be obvious, the stream of fluid provided by the pick up device (sensor 22a) is discharged into conical chamber 34 between the plug 36 and wall section 38 from tubes 32 in a direction tangential to the walls of the chamber 34. The combination of this tangential injection of fluid and the generally conical shape of chamber 34 results in the generation of a vortex. Restated, sensor 10 is a vortex generator and the ram air from conduit 22 produces a swirl in chamber 34. Conduit 24 communicates with chamber 34 and thus senses the pressure generated in sensor 10, which pressure is a function of the velocity of the vehicle since the input signal is the ram air from sensor 22a. As previously noted, the sensor or vortex generator 10 is affixed to and thus rotates with wheel housing 12. Rotating the vortex generator with the swirl drops the pressure at probe (output conduit) 24 while rotating the device against the swirl results in an increase in pressure at the output probe. Accordingly, depending upon the direction of injection of the ram air from tubes 32, the pressure at the entrance to conduits 24 either increases or decreases with decreases in the speed of rotation of wheel housing 12. A decrease in the speed of rotation of wheel housing 12 may indicate that the wheel is beginning to skid.

Figure 1:
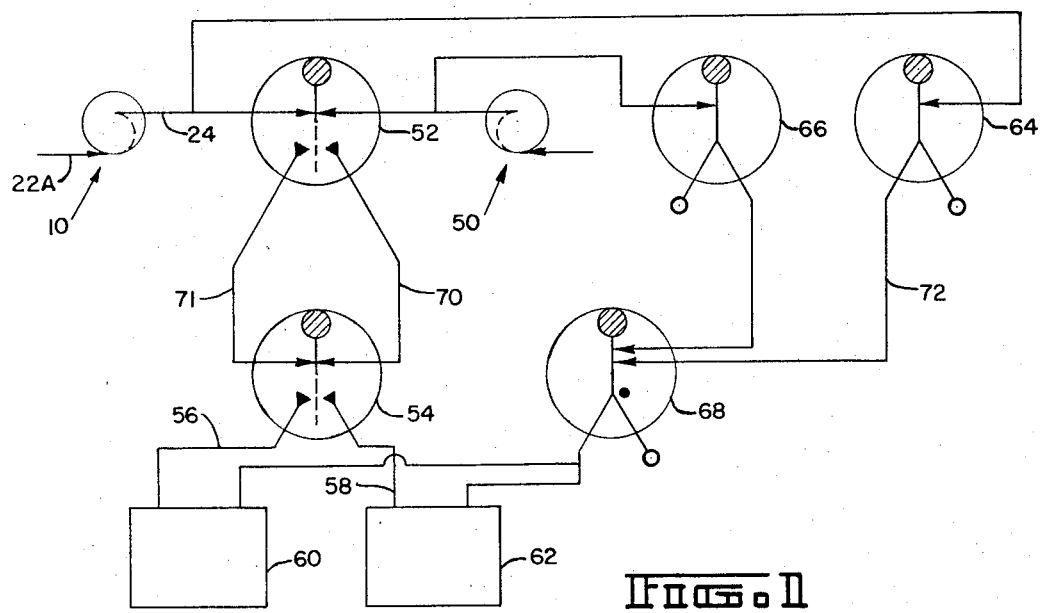
FIGURE 1 is a schematic diagram of a first embodiment of a pure fluid anti-skid brake control in accordance with the teachings of the present invention.

Sensor 10 will be employed with at least a second identical unit affixed to an oppositely disposed wheel on the vehicle. Referring to FIGURE 1, the second sensor is shown at 50. The output signals from sensors 10 and 50 are each applied to a control stream input of a proportional fluid amplifier 52. Proportional amplifier 52 is of a type well known in the art which has an input power stream supplied thereto from a suitable pressurized source of fluid. Under the usual condition with the wheels to which sensors 10 and 50 are affixed rotating at the same speed and their input sensors disposed in the same air stream, the inputs to amplifier 52 will be the same pressure and thus the power stream will not be deflected but will flow equally through the two output legs. However, should there be a pressure differential between the two inputs, more of the power stream will be deflected to an output channel commensurate with the lower pressure input.

The output streams from proportional amplifier 52 are applied as the inputs or control streams, via passages or conduits 70 and 71, to a second proportional amplifier 54 to cause deflection of the power stream in amplifier 54 to the appropriate output passage. The output signals from amplifier 54 are respectively applied, via passages or conduits 56 and 58, to control valves 60 and 62. Control valves 60 or 62 will be activated upon receipt of an output signal of magnitude commensurate with a deflection of the power stream from proportional amplifier 54. Upon activation, the control valves will cause bleeding of the pressure in the brake system of the wheel which is rotating at the lesser speed. Thus, the bleed control signals from amplifier 54 operate through valves 60 and 62 to override the pilot or operator's braking command and thus relieve brake pressure on the wheel which has a tendency to skid thereby increasing its speed so as to equalize the speed of the two wheels and in turn balance proportional amplifiers 52 and 54 so that their power streams are again split between the output legs.

The output pressure signals from sensors 10 and 50 are also respectively applied to bistable valves 64 and 66. In the embodiment being described, sensors 10 and 50 are rotated with the swirl produced by the injection of ram air. Thus, the pressure at the output probe of each of sensors 10 and 50 increases with vehicle velocity but decreases with increases in the speed of rotation of the wheels upon which they are mounted. Accordingly, the pressure at the output probes of sensors 10 and 50 has an inverse relationship to the rotational speed of the associated wheels. When a predetermined threshold pressure indicative of a skid (zero rotation equals high pressure) is applied as the input to either of bistable devices 64 or 66, a power stream in these devices will be switched from the normal or vent outlet to the other output passage of the device. These second outputs of bistable devices 64 and 66 are applied as inputs to a fluid AND gate 68. AND gate 68 may be similar to the type shown in U.S. Patent No. 3,191,611 issued June 29, 1965 to P. Bauer. Only when AND gate 68 receives input signals from both of bistable devices 64 and 66 will it deliver outputs to bleed valves 60 and 62.

In operation, with both wheels upon which sensors 10 and 50 are mounted rotating at the same speed, the inputs to and thus the outputs from proportional amplifier 52 will be balanced. However, should one of the wheels begin to skid, proportional amplifier 52 will deliver, via the deflected power stream, an output signal indicative of which wheel is skidding. For example, if the rotational speed of the wheel upon which sensor 10 is mounted should decrease without a corresponding decrease in the rotational speed of the wheel upon which sensor 50 is mounted, the pressure at the output probe 24 will increase. This will cause proportional amplifier 52 to deliver an output signal (the deflected power stream) at line 70. The signal at line 70 is applied as the control signal to proportional amplifier 54 and causes its power stream to be deflected into the output channel corresponding to output line 56. The fluid output signal on line 56, as described above, activates bleed valve 60 to relieve braking pressure on wheel 12. It should be noted that the system is gain compensated since the speed of response thereof is a function of the operating pressures and these pressures are directly proportional to the forward velocity of the vehicle upon which the system is mounted.

Still considering the condition with the wheel 12 on which sensor 10 is mounted in a skidding condition, the increase in pressure at output probe 24 is applied to the control stream input of bistable valve 66. The power stream in valve 66 will thus be deflected to its output line 72 and thence applied as a control signal to AND gate 68. However, with only one wheel skidding only a single input is applied to AND gate 68, the AND gate does not deliver an output signal to the bleed valves 60 and 62.

Considering now the situation where both wheels lock and begin to skid, since the speed of rotation of sensors 10 and 50 is still the same, the power stream in proportional amplifier 52 is not deflected but continues to be split. However, the increased pressures at the output probes of sensors 10 and 50 are respectively applied to bistable valves 64 and 66 and cause a change in state of these valves. The deflected power streams in valves 66 and 64 are applied to the dual inputs of AND gate 68 thereby causing the AND gate to deliver a bleed valve control signal to both of bleed valves 60 and 62. The bleed valve control signals override the pilot or operator's brake command and simultaneously relieve the braking force on both wheels.

While a preferred embodiment has been shown and described, various modifications and substitutions may be made without departing from the spirit and scope of this invention. For example, while the ram air injection into the wheel mounted sensors has been described as being in the direction in which the sensor is rotating, it is to be understood that rotation of the sensor against the swirl can also be employed. Thus, it is to be understood that this invention has been described by way of illustration and not limitation.

What is claimed is:

1. An anti-skid brake control system for a vehicle comprising:
    means operatively connected to a first wheel on the vehicle for generating a first stream of fluid, the pressure of said first fluid being commensurate with the rotational speed of said first side wheel;
    means operatively connected to a second wheel on the vehicle for generating a second stream of fluid, the pressure of said second fluid being commensurate with the rotational speed of said second wheel;
    means responsive to said first and second fluid streams for generating an output signal in response to a pressure difference between said first and second signals, said output signal being indicative of which of said wheels has the lesser rotational speed; and
    means responsive to said output signal for adjusting the braking force applied to the wheel which has the lesser rotational speed, said adjusting means causing a decrease in said braking force whereby said wheels will rotate at the same speed.

2. The apparatus of claim 1 wherein said means for generating first and second fluid streams each comprise:
    a source of fluid; and
    a vortex generator having inner and outer walls, an input connection connected to said fluid source and an output connection.

3. The apparatus of claim 2 wherein at least one of said walls of said vortex generator rotates with its associated wheel.

4. The apparatus of claim 3 wherein said fluid source comprises:
    means for generating a stream of fluid having a pressure commensurate with the velocity of the vehicle.

5. The apparatus of claim 4 wherein said input connection discharges said stream of fluid into said vortex generator tangentially to a rotating wall thereof.

6. The apparatus of claim 4 wherein said vortex generator is affixed to and rotates with its associated wheel and said input connection comprises:
    first conduit means mounted for rotation with said vortex generator and having its discharge end positioned to discharge fluid into the space between said inner and outer walls of said vortex generator and tangentially to one of said walls; and
    second conduit means communicating between the other end of said first conduit means and said means for generating a stream of fluid having a pressure commensurate with velocity, said second conduit means being nonrotating.

7. The apparatus of claim 4 wherein said means for generating an output signal in response to a pressure difference comprises:
    fluid proportional amplifier means.

8. The apparatus of claim 7 further comprising:
    second means responsive to said first and second fluid streams for providing a brake control signal when the pressure of both of said streams indicates a speed of rotation of both wheels less than a predetermined value; and
    means applying said brake control signal to said means for adjusting braking force to cause a decrease in the braking force applied to both wheels.

9. The apparatus of claim 8 wherein said second means responsive to said first and second fluid streams comprises:
    first bistable fluid means responsive to a predetermined pressure of said first stream for providing an output signal when the pressure of said first stream indicates that the first wheel is skidding;
    second bistable fluid means responsive to a predetermined pressure of said second stream for providing an output signal when the pressure of said second stream indicates that the second wheel is skidding; and
    fluid AND gate means responsive to the output signals from said first and second bistable means for generating a brake control signal when both of the wheels are skidding.

10. The apparatus of claim 1 wherein said means for generating first and second fluid streams each comprise:
    a vortex generator, said vortex generator having input and output connections;
    means for generating a stream of fluid having a pressure commensurate with the velocity of the vehicle and for applying said stream to the input of said vortex generator; and
    means for rotating said vortex generator at a rate commensurate with the speed of rotation of its associated wheel to provide an output signal whose pressure is a function of velocity and rotational speed.

11. The apparatus of claim 1 further comprising:
    second means responsive to said first and second fluid streams for providing a brake control signal when the pressure of both of said streams indicates a speed of rotation of both wheels less than a predetermined value; and
    means applying said brake control signal to said means for adjusting braking force to cause a decrease in the braking force applied to both wheels.

12. The apparatus of claim 10 further comprising:
    second means responsive to said first and second fluid streams for providing a brake control signal when the pressure of both of said streams indicates a speed of rotation of both wheels less than a predetermined value; and
    means applying said brake control signal to said means for adjusting braking force to cause a decrease in the braking force applied to both wheels.

13. The apparatus of claim 12 wherein said vortex generator comprises:
    means defining a chamber having an outer wall at least a part of which tapers toward an apex;
    means communicating with said input connection for injecting fluid into said chamber tangentially to a wall thereof;

means mounting said chamber defining means for rotation with its associated wheel; and means communicating between the apex of said chamber and said output connection.

14. The apparatus of claim 13 wherein said means for generating an output signal in response to a pressure difference comprises:

fluid proportional amplifier means.

15. The apparatus of claim 14 wherein said second means responsive to said first and second fluid streams comprises:

first bistable fluid means responsive to a predetermined pressure of said first stream for providing an output signal when the pressure of said first stream indicates that the first wheel is skidding;

second bistable fluid means responsive to a predetermined pressure of said second stream for providing an output signal when the pressure of said second stream indicates that the second wheel is skidding; and fluid AND gate means responsive to the output signals from said first and second bistable means for generating a brake control signal when both of the wheels are skidding.

References Cited

UNITED STATES PATENTS 3,004,801 10/1961 Wrigley _____ 188—21 X
3,021,181 2/1962 Fitch _____ 303—21

DUANE A. REGER, *Primary Examiner.*